United States Patent
Dominguez

(10) Patent No.: US 11,144,971 B2
(45) Date of Patent: *Oct. 12, 2021

(54) FACILITATION OF REAL-TIME INTERACTIVE FEEDBACK

(71) Applicant: AT&T Mobility II LLC, Atlanta, GA (US)

(72) Inventor: Brian Dominguez, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/774,861

(22) Filed: Jan. 28, 2020

(65) Prior Publication Data

US 2020/0167837 A1    May 28, 2020

Related U.S. Application Data

(63) Continuation of application No. 15/175,243, filed on Jun. 7, 2016, now Pat. No. 10,586,257.

(51) Int. Cl.
*G06Q 30/02* (2012.01)
*H04W 8/00* (2009.01)
(Continued)

(52) U.S. Cl.
CPC ..... *G06Q 30/0281* (2013.01); *G01C 21/3484* (2013.01); *H04W 4/023* (2013.01); *H04W 8/005* (2013.01)

(58) Field of Classification Search
CPC ............. G06Q 30/028; G06Q 30/0242; G06Q 30/0245; G06Q 30/02; G06Q 30/0203;
(Continued)

(56) References Cited

U.S. PATENT DOCUMENTS 5,331,544 A    7/1994   Lu et al.
6,831,896 B1   12/2004  Lempiö et al.
(Continued)

FOREIGN PATENT DOCUMENTS

WO    2002025511 A1    3/2002
WO    2013184848 A1   12/2013
(Continued)

OTHER PUBLICATIONS

"Home | On the Spot Systems," Retrieved at http://www.onthespotsystems.com/ on Apr. 12, 2016, 2 pages.
(Continued)

*Primary Examiner* — Aaron L Troost
(74) *Attorney, Agent, or Firm* — Amin, Turocy & Watson, LLP

(57) ABSTRACT

A real-time customer survey system can be implemented by monitoring real-time and previous location data associated with a customer. The system can analyze the location data in accordance with customer preferences, customer social media profiles, and/or information that has been inferred by the system. The location data can be obtained in multiple forms including video, audio, wireless device communications, etc. The location data, in conjunction with customer preference data can be presented to the customer in the form of an avatar, an audio output, a video output, and/or haptic feedback.

20 Claims, 12 Drawing Sheets

(51) Int. Cl.
*H04W 4/02* (2018.01)
*G01C 21/34* (2006.01)

(58) Field of Classification Search
CPC ... G01C 21/3484; H04W 4/023; H04W 8/005
See application file for complete search history.

(56) References Cited

U.S. PATENT DOCUMENTS

| | | | |
|---|---|---|---|
| 8,208,399 | B2 | 6/2012 | Yariv et al. |
| 8,473,304 | B2 | 6/2013 | Black |
| 8,818,841 | B2 | 8/2014 | Dupre et al. |
| 10,586,257 | B2 * | 3/2020 | Dominguez ....... G06Q 30/0281 |
| 2002/0042750 | A1 | 4/2002 | Morrison |
| 2003/0039379 | A1 | 2/2003 | Gutta et al. |
| 2008/0097769 | A1 | 4/2008 | Galvin et al. |
| 2009/0299814 | A1 | 12/2009 | Grigsby et al. |
| 2010/0131356 | A1 | 5/2010 | Stevens et al. |
| 2012/0232953 | A1 | 9/2012 | Custer |
| 2013/0041837 | A1 | 2/2013 | Dempski et al. |
| 2013/0266925 | A1 * | 10/2013 | Nunamaker, Jr. ...... G06N 20/00 434/362 |
| 2013/0346155 | A1 | 12/2013 | Briggs |
| 2014/0304335 | A1 | 10/2014 | Fung et al. |
| 2014/0337100 | A1 | 11/2014 | Crawford et al. |
| 2014/0347268 | A1 | 11/2014 | Khosravy et al. |
| 2014/0351016 | A1 | 11/2014 | Khundmiri |
| 2014/0379465 | A1 | 12/2014 | Brazell |
| 2015/0065170 | A1 | 3/2015 | Brisebois |
| 2015/0301597 | A1 | 10/2015 | Rogers et al. |
| 2015/0302426 | A1 | 10/2015 | Rogers et al. |
| 2015/0310457 | A1 | 10/2015 | Smith |
| 2015/0310508 | A1 | 10/2015 | Pattekar et al. |
| 2015/0356578 | A1 | 12/2015 | Li |
| 2016/0007083 | A1 | 1/2016 | Gurha |
| 2016/0098766 | A1 | 4/2016 | Alam et al. |
| 2016/0110740 | A1 * | 4/2016 | Farrar ................ G06K 9/00335 705/7.32 |
| 2016/0210682 | A1 | 7/2016 | Kannan et al. |
| 2017/0011423 | A1 * | 1/2017 | Douglas ................ H04W 4/029 |

FOREIGN PATENT DOCUMENTS

| | | |
|---|---|---|
| WO | 20140145204 A1 | 9/2014 |
| WO | 2015028904 A1 | 3/2015 |
| WO | 201518781 A1 | 12/2015 |
| WO | 2015188012 A1 | 12/2015 |

OTHER PUBLICATIONS

"How to Identify Your Customer Touchpoints," SurveyMonkey, Retrieved at https:/lwww.surveymonkey.com/mp/identify-customer-touchpoints/ on Apr. 20, 2016, 5 pages.

"Optimize Your Customer Experience," 2015, InMoment, Inc, Retrieved at http://www.inmoment.com/ on Apr. 20, 2016, 7 pages.

Stefaniak et al., "Long John Silver's Relies on IVR to Measure Customer Opinions," Quirk's Marketing Research 4 Media, Oct. 2001, Quirk Enterprises, Inc., Retrieved at http://www.quirks.com/articles/a2001/20011009.aspx on Apr. 20, 2016, 8 pages.

Non-Final Office Action received for U.S. Appl. No. 15/175,243 dated Sep. 5, 2017, 33 pages.

Final Office Action received for U.S. Appl. No. 15/175,243 dated Jan. 2, 2018, 34 pages.

Non-Final Office Action received for U.S. Appl. No. 15/175,243 dated Oct. 22, 2018, 34 pages.

Final Office Action received for U.S. Appl. No. 15/175,243 dated May 1, 2019, 42 pages.

* cited by examiner

FACILITATION OF REAL-TIME INTERACTIVE FEEDBACK

RELATED APPLICATION

The subject patent application is a continuation of, and claims priority to, U.S. patent application Ser. No. 15/175,243 (now U.S. Pat. No. 10,586,257), filed Jun. 7, 2016, and entitled "FACILITATION OF REAL-TIME INTERACTIVE FEEDBACK," the entirety of which application is hereby incorporated by reference herein.

TECHNICAL FIELD

This disclosure relates generally to facilitating customer feedback during real-time customer experiences. More specifically, this disclosure relates to location-based services that can assist in garnering real-time customer feedback during real-time customer experiences.

BACKGROUND

Location-based services (LBS) are a general class of computer program-level services that use location data to control features. As such LBS is an information service and has a number of uses in social networking today as an entertainment service, which is accessible with mobile devices through the mobile network and which uses information on the geographical position of the mobile device.

LBS are used in a variety of contexts, such as health, indoor object search entertainment, work, personal life, etc. LBS is critical to many businesses as well as government organizations to drive real insight from data tied to a specific location where activities take place. The spatial patterns that location-related data and services can provide is one of the most powerful and useful aspects where location is a common denominator in all of these activities and can be leveraged to better understand patterns and relationships.

LBS include services to identify a location of a person or object, such as discovering the nearest banking cash machine or the whereabouts of a friend or employee. LBS can include parcel tracking and vehicle tracking services. LBS can include mobile commerce when taking the form of coupons or advertising directed at customers based on their current location. They include personalized weather services and even location-based games. LBS can also be used to facilitate real-time polling services for customers within a specific geographical area.

The above-described background relating to LBS is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
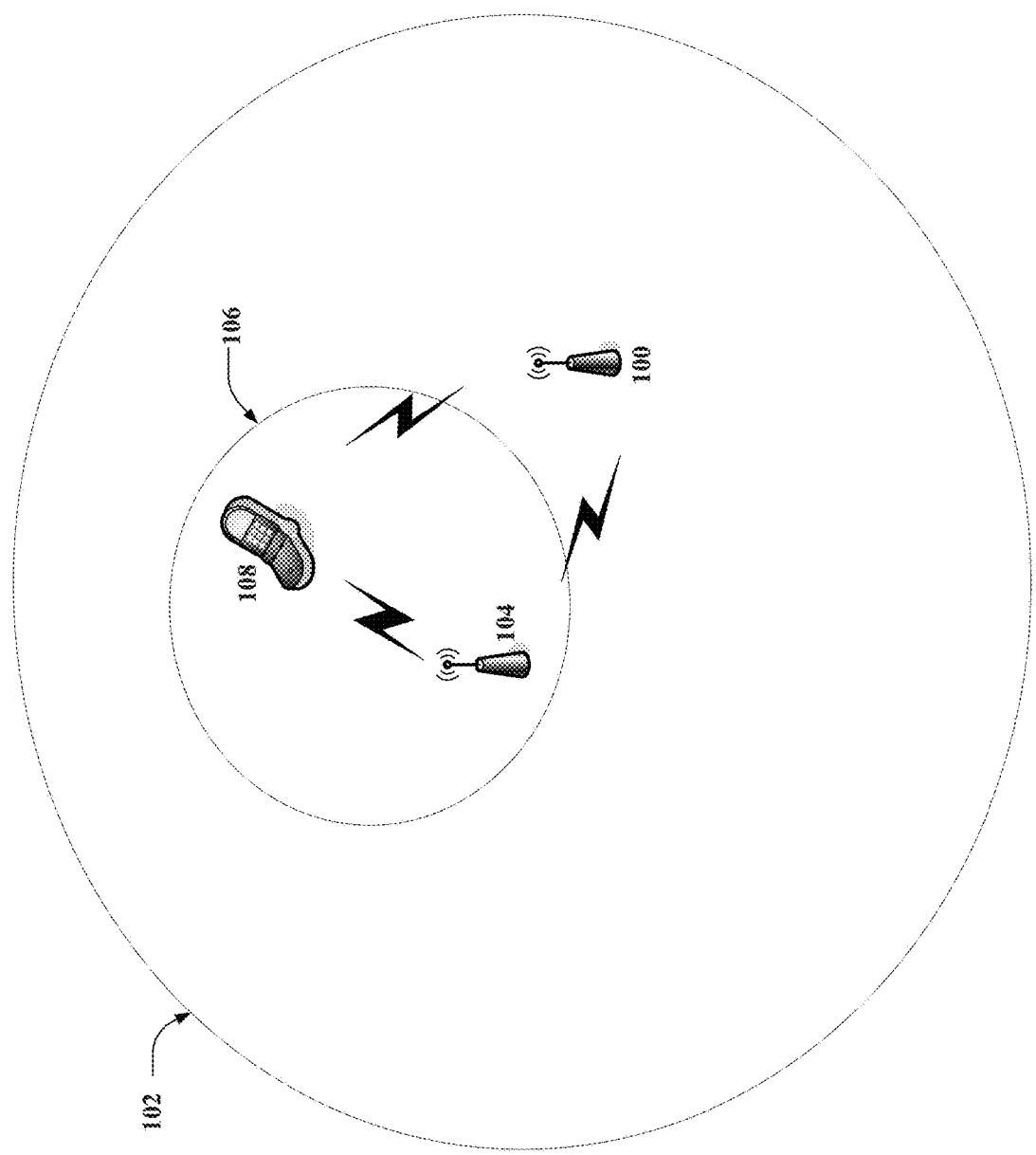
FIG. 1 illustrates an example wireless network comprising location based customer feedback services according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate an interactive feedback system.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate an interactive feedback system. Facilitating the interactive feedback system can be implemented in connection with any type of device with a connection to the communications network such as: a mobile handset, a computer, a handheld device, or the like. Alternatively, a user can provide inputs to the feedback system via gestures.

A real-time customer feedback experience can be interactive and gamified to sense, log, and act on customer feedback in a more engaging manner without breaking the stride of the customer. The disclosed system can separate signal from noise, and also recognize that what is considered noise in one case or to one stakeholder might be important and a signal in another in another case. Therefore, receiving customer feedback about something other than what is being asked could be shared with other entities.

The interactive customer feedback system can comprise a system of components configured to accept data inputs via video, audio, microphone, haptic, sensory, etc., and can also be integrated into any physical objects such as a canopy, floor, lamp post, hallway, walls, displays, screens, etc.

An interactive feedback system can be implemented in areas including, but not limited to, retail, hospitality, and/or amusement environments, to obtain data such as purchase satisfaction and/or willingness-to-recommend. The interactive feedback system can be implemented in any environment where sensing/listening, analytics, and acting on stakeholder experience is a priority.

For instance, the system can streamline multi-modal collection of feedback by catering to a customer's preferences to boost participation. The system can also become more predictive and be personally customizable based on customer preferences. This multi-modal collection can include, but is not limited to gestures, voice, and/or haptic feedback. For example, following a certain path can indicate customer satisfaction. The system's sensing component can facilitate interaction with target audiences to catalog and anticipate their feedback, engage them in meaningful ways, and gamify the interactions. The output and data can enable solutions for improved experiences, products, and information exchanges with other feedback systems in a network. The network can be a platform of analytics that hosts recommendations, offers rewards, and manages balance of trade (relevant survey data) with partner feedback. Thus, a clearinghouse of feedback can be shared and monetized with partners.

An in-stride component, where feedback is collected, can be illustrated by a customer leaving a ride at a theme park and walking on green footsteps if they liked the ride or red footsteps if they did not like the ride. Then, without breaking stride, an interactive and configurable set of mechanisms could tease-out why they did not like the ride and adjust parameters (temperature, cleanliness, wait time, etc.) within the system's control in real-time. A similar implementation could also be deployed for gathering other survey information, such as net promoter scores, while leaving a retail store rather than receiving a text or email survey after the store visit. Survey questions can be predicated or analyzed based on weather, rate of exit speed, direction, time-of-day, etc. For instance, a speedy exit from a retail store can be analyzed in conjunction with the weather to determine that a customer left quickly to avoid a downpour of rain that just began to occur and not because of an in-store customer experience. A configurable sensing engine component can dynamically adjust offers, check-out times, etc. based on available information as well as exclude certain audiences based on specified parameters.

The in-stride component can also facilitate guiding/routing a customer to a specific area or item within a retail store based on customer feedback and preference. For instance, based on a customer's social media profile, inferred/deduced preferences, and/or previous feedback or real-time feedback, the system can deduce that the customer is a baseball fan and direct the customer down an aisle for baseball memorabilia as the customer is transitioning towards another item or a specific endpoint within the retail store.

There are four fundamental problems that the interactive feedback system can address: 1) obtaining accurate survey feedback via a finer granularity of responses/customer inputs (going a layer deeper on 'why'); 2) boosting survey responses via an interactive, in-stride, and gamified approach; 3) acting on survey in near real-time to adjust parameters; and 4) monetizing feedback that is provided—the wealth of data can then be used in more predictive analysis.

The interactive feedback system can comprise a sensing component that assesses a target audience and captures feedback. Beyond the concept of asking questions and receiving responses, the sensing engine can separate and simultaneously input opportunities, connected to a platform of analytics. Inputs can be gestures (thumbs-up/down on the way out of a store), voice commands, haptic feedback, (walking on a certain path), etc. The sensing component can also broadcast public or permissible information from mobile devices, and/or receipts that capture specific information, etc. Dynamic adjustments and exclusions may be made via the sensors as well, excluding certain ages for example or other configurable parameters. For instance, persons under the age of 21 can be excluded from being prompted for information related to purchases of alcoholic beverages.

An engage in-stride component can engage a customer in-stride with the over-arching approach that the customer does not need to stop or break stride to provide feedback. The in-stride component can also take into account vehicular motion. While in motion and entering/leaving the premises, feedback may be gathered via targeted interaction, which can be visual, artificial intelligence, directed audio, etc. Engagement may be amplified via configurable and opt-in parameters, which can include demographic and/or publically available social media inputs.

A customized gamification component can be configurable to engage customers and adapt to available and trending information/preferences to customize the feedback interaction. Gamification components can include, but are not limited to, speed of exit, proximity of other guests, weather, time of day, length of visit, available public/permitted information, etc. For example, if a customer with a social media profile has opted-in to the gamification component of the interactive feedback system, then the survey may be gamified to fit known preferences. For example, a customer that likes Jeopardy® can receive survey questions in the form of answers and is required to provide feedback in the form of questions.

Customers can also be engaged via objects within certain areas. For instance, a cashier counter at a retail store can be configured to engage customers as they are checking out or shortly thereafter. The customers can interact with a screen interface, a video interface, an audio interface, an interface capable of receiving gesture-based motion, etc. The customers can also interact with a virtual reality component or an avatar generated to extract feedback data from the customer in a seamless dialogue and/or visual-based communication.

Furthermore, the interactive feedback system can comprise a prediction component predicated on collected data and profile information. The prediction component can leverage past history, and feedback from other survey-takers with similar personas. Time-shifting customer interactions can deliver frequently asked questions (FAQs) on purchases, cross-sells, prompts with did-you-know, and/or provide share-with-a-friend promotion opportunities.

With feedback responses in-house, multiple stakeholders can extract value. For instance, an organization interested in specific feedback plus any ancillary partner feedback collected via the interactive feedback system can combine sets of data and trends, resulting in new insights, products info, and/or solutions. For example the organization can survey customers about a ride at an amusement park for example, and receive feedback about beverages being served including any overarching metadata. In another example, the amusement park can retain and/or upload data, it believes to be relevant to another partner, to a clearinghouse where beverage companies can bid on the data and/or pay for it outright. The beverage company could also exchange data that it has obtained from customers with regards to amusement parks with the amusement park via a data exchange platform.

An analytics platform can synthesize the data, code and catalog feedback, and offer real-time interactions via client portals. Additionally, the platform can manage and monetize a balance-of-trade of partner organizations feedback when insights are gathered indirectly. Client and partner portals can model scenarios about demand, offer theory-testing modules, and suggest trends. Additionally, feedback loops can begin to generate experiences on the front-end of customer visits as preferences are retained and served back to individuals during their entrance into a particular geographic area.

Real-time feedback can improve time-to-market for products, compelling features, and real-time pivot opportunities for experiences based on customer demand. The additional data can also provide a foundation for new offers and potential advertising opportunities reflective of a broader participating customer base. The additional scale of respondents should also contribute to less sample bias (either extremely satisfied or extremely dissatisfied). Furthermore, there is an added benefit of improved employee programs—retaining those top performers who are providing top experiences. As the data grows, feedback loops can begin to generate experiences on the front-end of customer visits as preferences are retained and served back to individuals. The system can also allow for segmenting (by persona, demographic, etc.) preferences for customers providing the feedback.

It should also be noted that an artificial intelligence (AI) component can facilitate automating one or more features in accordance with the disclosed aspects. A memory and a processor as well as other components can include functionality with regard to the figures. The disclosed aspects in connection with the interactive feedback system can employ various AI-based schemes for carrying out various aspects thereof. For example, a process for detecting one or more trigger events, sending a prompt as a result of the one or more trigger events, and modifying reported feedback, and so forth, can be facilitated with an example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of interactive feedback systems, for example, attributes can be a frequency band and a technology and the classes can be gestured feedback. In another example, the attributes can be a frequency band, a technology, and the presence of an object and the classes can be an input type value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a transmit power, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving an indication that a mobile device is within a range of a first wireless network device and monitoring a location of the mobile device while within the range of the first wireless network device. In response to the monitoring the location of the mobile device, sending prompt data representative of a prompt to the mobile device via a second wireless network device; and in response to the sending the prompt data, receiving feedback data related to feedback from a customer identity associated with the mobile device that was input in response to the prompt.

According to another embodiment, a system can facilitate, the receiving interest data related to a first item of interest based on a personal interest of a user identity. Based on the interest data, determining a second item of interest and a location associated with the second item of interest; and in response to the determining, presenting the second item of interest and the location associated with the second item of interest and prompting for an input, from the user identity, associated with the second item of interest.

According to yet another embodiment, described herein is a machine-readable storage medium that can perform the operations comprising analyzing user preference data related to a user shopping preference determined to be associated with a user identity comprising generating additional user preference data based on the user preference data. The machine-readable storage medium can receive location data associated with a location of a user device associated with the user identity, and based on the location data, prompt for an input associated with the additional user preference data. Additionally, in response to receiving the input, the machine-readable storage medium can aggregate the user preference data and the additional user preference data resulting in aggregated user preference data, wherein the aggregated user preference data is employable to predict a user behavior associated with the user identity These and other embodiments or implementations are described in more detail below with reference to the drawings.

Referring now to FIG. 1, illustrated is an example wireless network comprising location based customer feedback services according to one or more embodiments. A wireless network device 100 can have an area 102 wherein communication with a mobile device 108 can occur. It should be noted that although FIG. 1 shows area 102 to be a circle, the area 102 and all other areas can be of any size and dimension (square, oval, triangle, etc.). Once it has been determined that the mobile device 108 is within the area 102 and is in communication with the wireless network device 100, it can next be determined when the mobile device has entered another area 106 associated with another wireless network device 104 of the system. The other wireless network device 104 can communicate with the mobile device 108 and communicate with the wireless network device 100. More specifically, the other wireless network device 104 can communicate to the wireless network device 100 that the other wireless network device 104 is in communication with the mobile device 108 and vice versa.

Based on two-way and/or three-way communication between the mobile device 108, the wireless network device 100, and the other wireless network device 104, survey data can be sent to the mobile device 108 to prompt the mobile device 104 user's feedback regarding his/her experience, direct the mobile device 108 user to an item, and/or provide the mobile device 108 user with directions to the item. The prompt for feedback can also be in the form of communication with the user via a stationary interface near the user, an avatar generated to engage the user in verbal communication, and/or an indication to the user to gesture (i.e.: thumbs-up, high-five, head-nod, etc.

Figure 2:
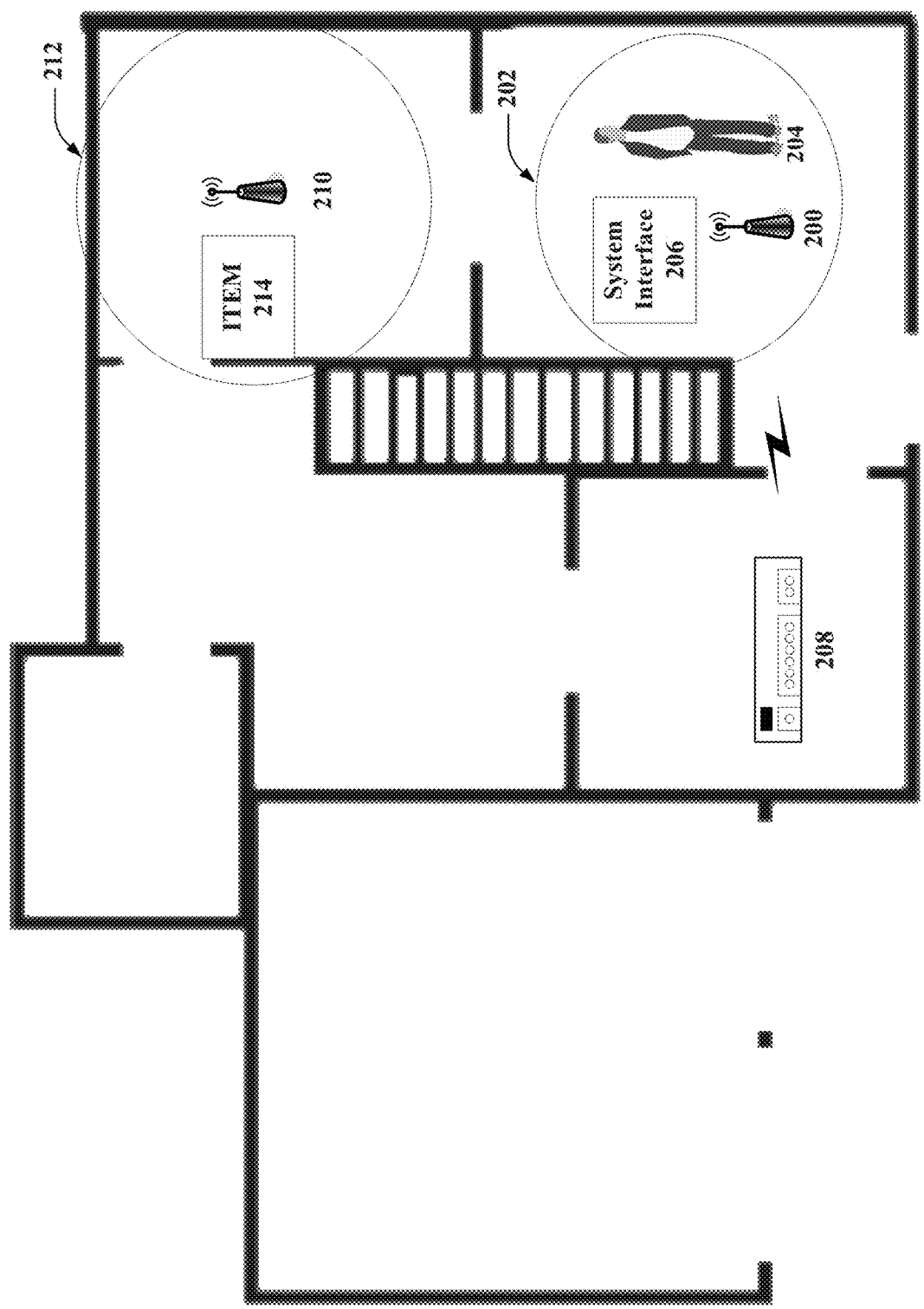
FIG. 2 illustrates an example wireless network performing location based customer feedback services in accordance with an item location according to one or more embodiments.

Referring now to FIG. 2, illustrated is an example wireless network performing location based customer feedback services in accordance with an item location according to one or more embodiments. The system can determine a person's location, without the use of a mobile device, via video, motion sensor, and/or thermal tracking methodologies. For instance, a person 204 can be determined to be within a certain range 202 of a wireless networking device 200 via thermal imaging tracking methodologies managed by a master wireless network device 208. The person 204 entering the range 202 can trigger the system to begin to elicit feedback data, via a system interface 206, from the person 204 based on any known information and/or dynamically generated inferences associated with survey questions. For example, the system could infer that based on the person 204 previously being in range 212 of wireless networking device 210, which encompasses item 214, that the person 204 has some interest in the item 214. Therefore, the survey question could focus on what made the person 204 bring the item 214 to a register for checkout near the wireless networking device 200.

In one embodiment, the survey question can be presented from the system interface 206 and/or responded to using the system interface 206. The system can also infer that the person 204 brought the item 214 to the register based on some previous action by the person 204, a social media profile of the person 204, and/or previous behavior of the person 204 during this current shopping session and generate survey questions accordingly. Conversely, the survey questions can be presented based on an indication that the person 204 did not bring the item 214 to the register, thereby soliciting feedback as to why the person 204 did not want the item 214.

In another alternative embodiment, the system can infer that the item 214 is an item of interest to the person 204, yet the person 204 did not bring the item 214 to the register or the person did not enter within the range 212. Therefore, the system can provide, via the system interface 206, reminders, questions, and/or route information to the item 214, which will be presented to the person 204.

Figure 3:
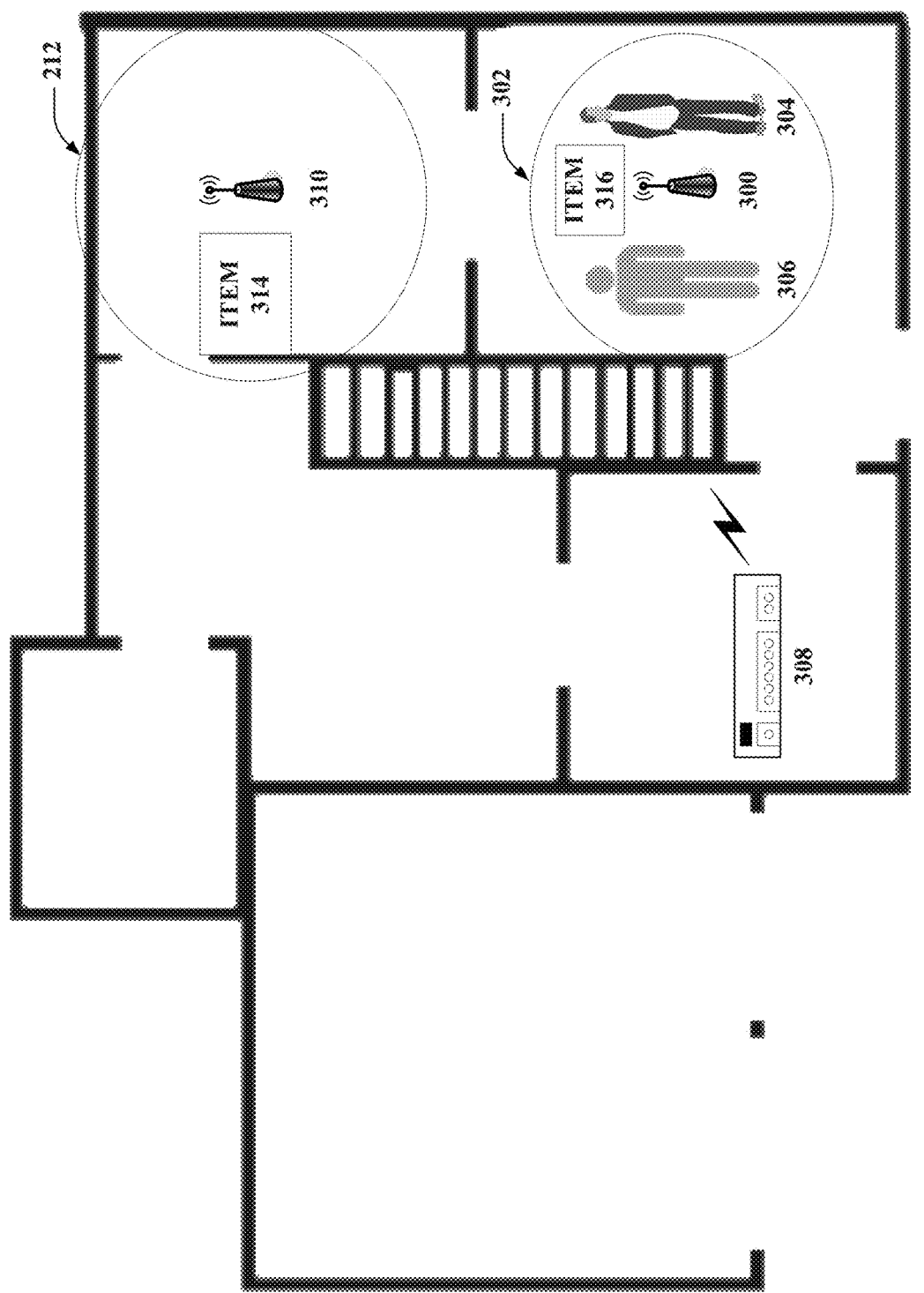
FIG. 3 illustrates an example wireless network performing location based customer feedback services via an avatar and in accordance with an item location according to one or more embodiments

Referring now to FIG. 3, illustrated is an example wireless network performing location based customer feedback services via an avatar and in accordance with an item location according to one or more embodiments. The system can determine a person's location, without the use of a mobile device, via video, motion sensor, and/or thermal tracking methodologies. For instance, a person 304 can be determined to be within a certain range 302 of a wireless networking device 300 via video tracking methodologies managed by a master wireless device 308. The person 304 entering the range 302 can trigger the system to begin to elicit feedback data, via an avatar 306, from the person 304 based on any known information and/or dynamically generated inferences associated with survey questions. For example, the system could infer that based on the person 304 bringing an item 316 into the range 302 of wireless networking device 300 that the person 304 has some interest in item 314. Therefore, the survey question could focus on what made the person 304 bring the item 316 to a register for checkout near the wireless device 300.

In one embodiment, the survey question can be presented directly from the avatar 306. The system can also infer that the person 304 brought the item 316 to the register based on some previous action by the person 304, a social media profile of the person 304, and/or previous behavior of the person 304 during this current shopping session and generate survey questions accordingly. Conversely, the survey questions can be presented based on an indication that the person 304 did not bring the item 314 to the register, thereby soliciting feedback as to why the person 304 did not want the item 314.

In another alternative embodiment, the system can infer that the item 314 is an item of interest to the person 304, yet the person 304 did not bring the item 314 to the register because the person 304 brought the item 316 to the register, and/or the person did not enter within the range 312. Therefore, the system can verbally and/or visually engage the person 304, via the avatar 306 by presenting reminders, questions, inventory, and/or route information to the item 314, which will be presented to the person 304.

Figure 4:
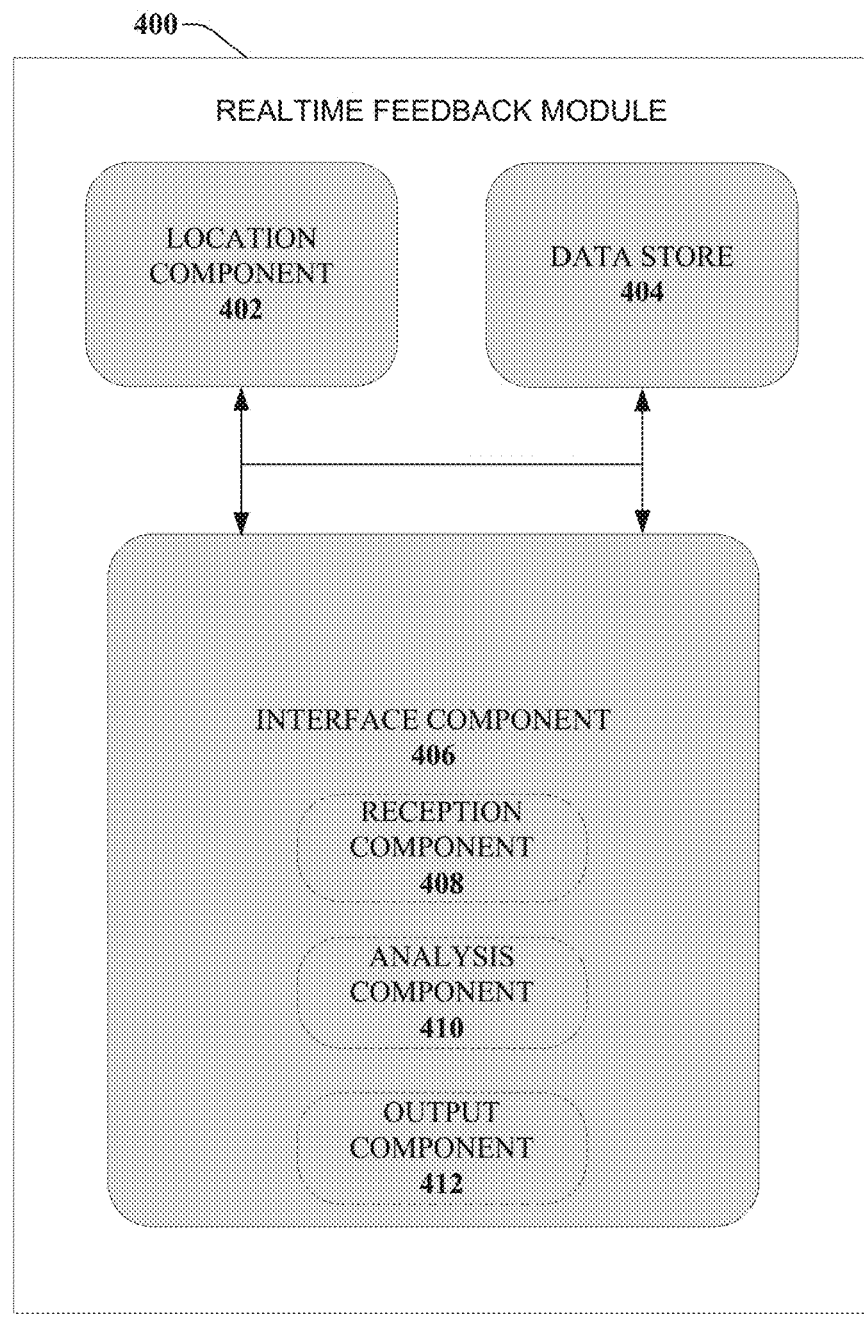
FIG. 4 illustrates an example wireless network location based feedback services module.

Referring now to FIG. 4, illustrated is an example wireless network location based feedback services module. A real-time feedback module 400 can comprise a location component 402, a data store 404, which can communicate with an interface component 406. The location component 402 can be configured to determine a location of a person in relation to the real-time feedback module 400, which can also comprise several network devices stationed in various positions relative to the real-time feedback module 400. The location component 402 can comprise various forms of tracking including, but not limited to, video tracking, audio tracking, thermal tracking, pressure tracking, etc. Location information received by the location component 402 can be stored in the data store 404 and sent/shared with the interface component 406.

The interface component 406 can comprise a reception component 408, an analysis component 410, and an output component 412. The reception component 408 can be configured to receive data related to a customer's preferences, location, geographic environment, weather, time, etc. Based on the data received by the reception component 408, the analysis component 410 can analyze the data to generate or infer certain outcomes, which can also be statistically represented. External data related to a customer's social media profile and/or other preferences can be included in the analysis performed by the analysis component 410. The output component 412 can output information related to the analysis. For instance, the output component 412 can output a survey question based on an analysis of a customer's location. Furthermore, the interface component 406 can be configured to receive an answer to the survey question via the reception component 408. Thereafter, all received, output, and/or inferred data can be stored at the data store 404. It should be noted that the interface component 406 can include, but is not limited to: a display screen, a video camera, a microphone and speaker system, a haptic feedback system, an avatar, and/or a virtual reality.

Figure 5:
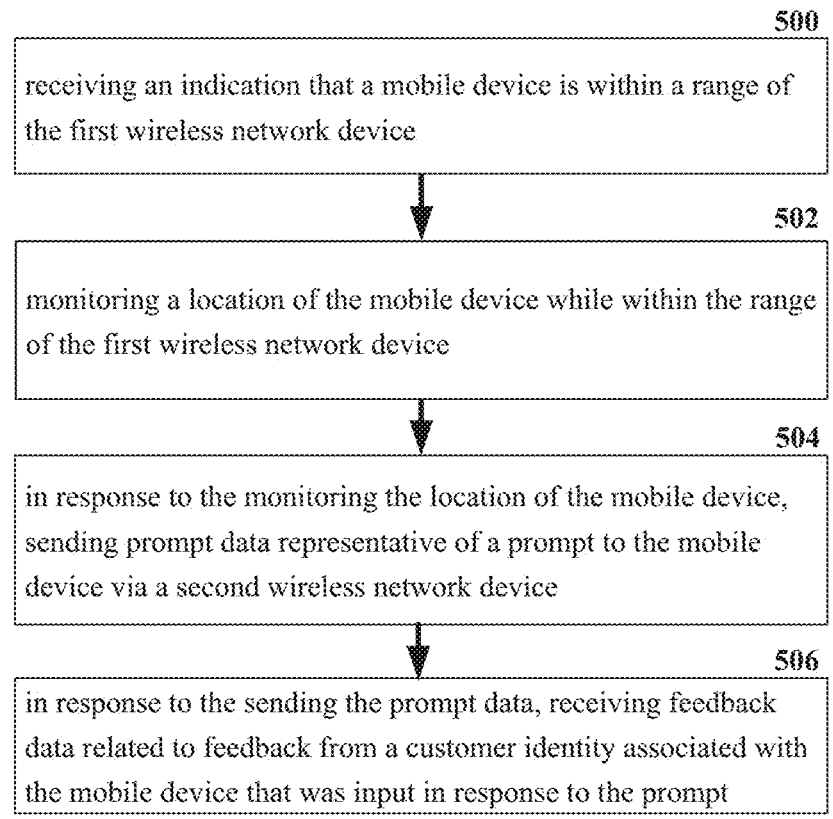
FIG. 5 illustrates an example schematic system block diagram of location based feedback services according to one or more embodiments.

Referring now to FIG. 5, illustrated is an example schematic system block diagram of location based feedback services according to one or more embodiments. At element 500, the system can receive, by a first wireless network device, an indication that a mobile device is within a range of the first wireless network device. At element 502, the system can monitor, by the first wireless network device, a location of the mobile device while within the range of the first wireless network device. The system can comprise several wireless networking devices that have a communication areas associated with the wireless networking devices.

Depending upon a mobile device being determined to be within the range associated with the wireless networking device, certain outcomes can be inferred and certain actions can be taken. Furthermore, the relationship between distance of the wireless networking devices in relation to each other can be utilized to determine an outcome. For instance, an indication that a mobile device is within range of one wireless networking device prior to being in range of another wireless networking device can be used to infer a specific outcome. In response to the monitoring the location of the mobile device, the system can send, by the first wireless network device, prompt data representative of a prompt to the mobile device via a second wireless network device at element 504. Based on determined outcomes and inferences, the system can send a message to a customer to prompt the customer to provide information. Consequently, in response to the sending the prompt data, the system can receive, by the first wireless network device, feedback data related to feedback from a customer identity associated with the mobile device that was input in response to the prompt at element 506.

Figure 6:
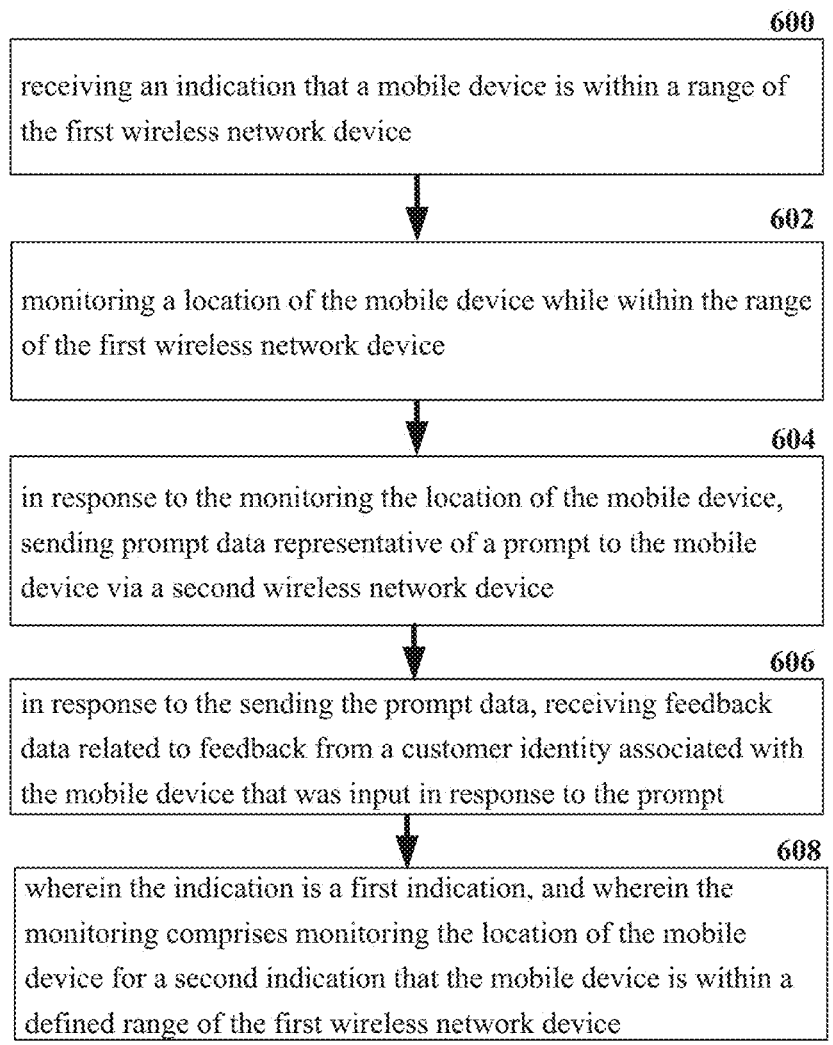
FIG. 6 illustrates an example schematic system block diagram of location based feedback services based on range according to one or more embodiments.

Referring now to FIG. 6, illustrated is an example schematic system block diagram of location based feedback services based on range according to one or more embodiments. At element 600, the system can receive, by a first wireless network device, an indication that a mobile device is within a range of the first wireless network device. At element 602, the system can monitor, by the first wireless network device, a location of the mobile device while within the range of the first wireless network device. The system can comprise several wireless networking devices that have a communication areas associated with the wireless networking devices.

Depending upon a mobile device being determined to be within the range associated with the wireless networking device, certain outcomes can be inferred and certain actions can be taken. Furthermore, the relationship between distance of the wireless networking devices in relation to each other can be utilized to determine an outcome. For instance, an indication that a mobile device is within range of one wireless networking device prior to being in range of another wireless networking device can be used to infer a specific outcome. In response to the monitoring the location of the mobile device, the system can send, by the first wireless network device, prompt data representative of a prompt to the mobile device via a second wireless network device at element 604.

Based on determined outcomes and inferences, the system can send a message to a customer to prompt the customer to provide information. Consequently, in response to the sending the prompt data, the system can receive, by the first wireless network device, feedback data related to feedback from a customer identity associated with the mobile device that was input in response to the prompt at element 606. At element 608, the indication can be a first indication, and wherein the monitoring can comprise monitoring the location of the mobile device for a second indication that the mobile device is within a defined range of the first wireless network device. As mentioned above, the relationship between where the mobile device is in respect to a first wireless networking and a second wireless networking device can be determinative of what outcomes can be inferred and what can be presented to the customer.

Figure 7:
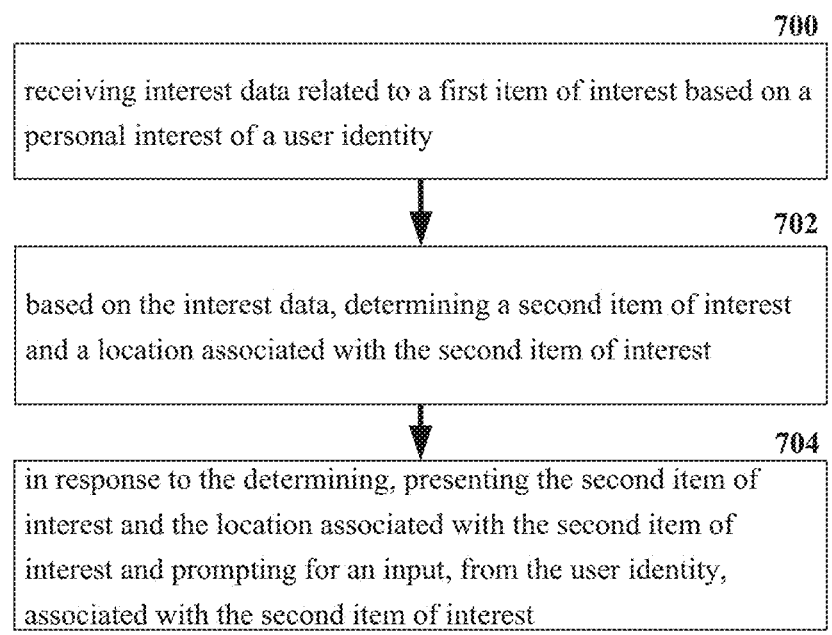
FIG. 7 illustrates an example schematic system block diagram of location based feedback services related to items of interest according to one or more embodiments.

Referring now to FIG. 7, illustrated is an example schematic system block diagram of location based feedback services related to items of interest according to one or more embodiments. At element 700, interest data related to a first item of interest based on a personal interest of a user identity can be received. The location of the first item can be relative to a wireless networking device associated with a range of communication. Based on the interest data, a second item of interest and a location associated with the second item of interest can be determined at element 702. The location of the second item of interest can also be relative to the wireless networking device or another wireless networking device. For instance based on receiving an indication that a user likes peanut butter crackers, the system can determine/infer that the person might also like peanut butter cookies and then prompt the user for an input associated with peanut butter cookies. Consequently, the system can present the user with the location associated with the peanut butter cookies. In response to the determining, presenting the second item of interest and the location associated with the second item of interest and prompting for an input, from the user identity, associated with the second item of interest at element 704.

Figure 8:
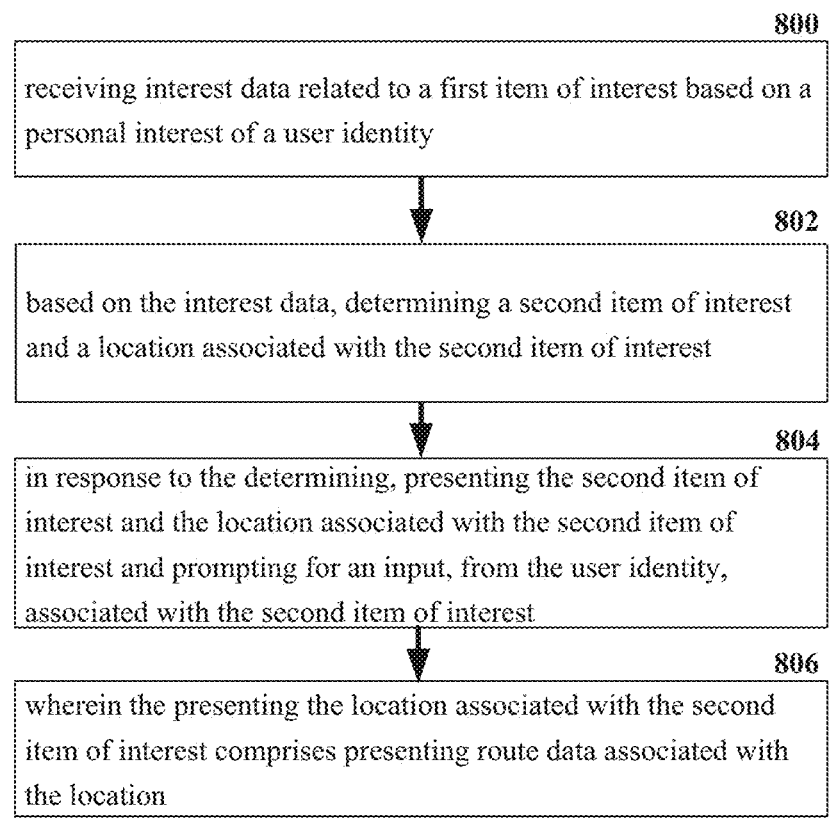
FIG. 8 illustrates an example schematic system block diagram of location based feedback services related to items of interest and a route associated with the items of interest according to one or more embodiments.

Referring now to FIG. 8, illustrated is an example schematic system block diagram of location based feedback services related to items of interest and a route associated with the items of interest according to one or more embodiments. At element 800, interest data related to a first item of interest based on a personal interest of a user identity can be received. The location of the first item can be relative to a wireless networking device associated with a range of communication. Based on the interest data, a second item of interest and a location associated with the second item of interest can be determined at element 802. The location of the second item of interest can also be relative to the wireless networking device or another wireless networking device. For instance based on receiving an indication that a user likes peanut butter crackers, the system can determine/infer that the person might also like peanut butter cookies and then prompt the user for an input associated with peanut butter cookies. Consequently, the system can present the user with the location associated with the peanut butter cookies. In response to the determining, presenting the second item of interest and the location associated with the second item of interest and prompting for an input, from the user identity, associated with the second item of interest at element 804. At element 806, the system can present the location associated with the second item of interest by presenting route data associated with the location. After prompting the use for input data, the system can provide the use with route data indicated of a route (or several routes) to get to the item.

Figure 9:
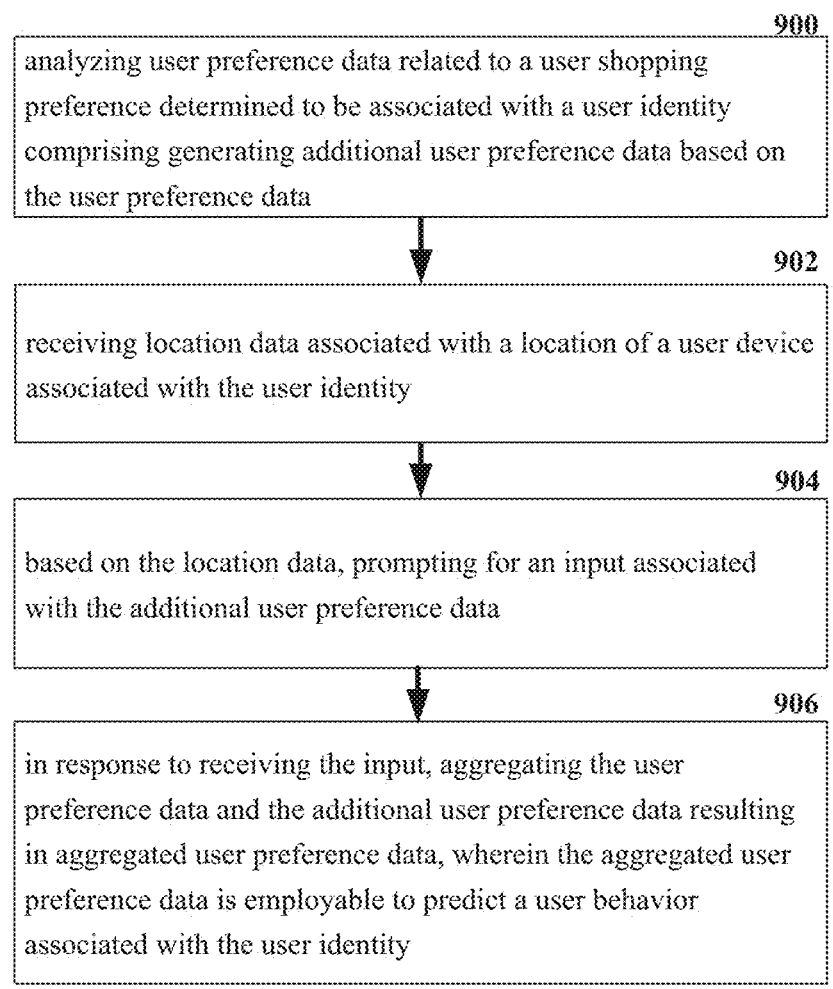
FIG. 9 illustrates an example schematic system block diagram of location based feedback services in accordance with predicting user behavior according to one or more embodiments.

Referring now to FIG. 9, illustrated is an example schematic system block diagram of location based feedback services in accordance with predicting user behavior according to one or more embodiments. At element 900, user preference data related to a user shopping preference determined to be associated with a user identity comprising generating additional user preference data based on the user preference data can be analyzed. The user preference data can be real-time communication (audible, gesture, mobile device, etc.) and/or obtained from social media/profile preferences. At element 902 location data associated with a location of a user device associated with the user identity can be received. The location data of the device can be used to provide a general location of the user of the mobile device in relation to areas/items of interest. Based on the location data, an input associated with the additional user preference data can be prompted at element 904. The input prompt can be in relation to a user shopping preference and in response to receiving the input, the user preference data and the additional user preference data can be aggregated resulting in aggregated user preference data, wherein the aggregated user preference data is employable to predict a user behavior associated with the user identity.

Figure 10:
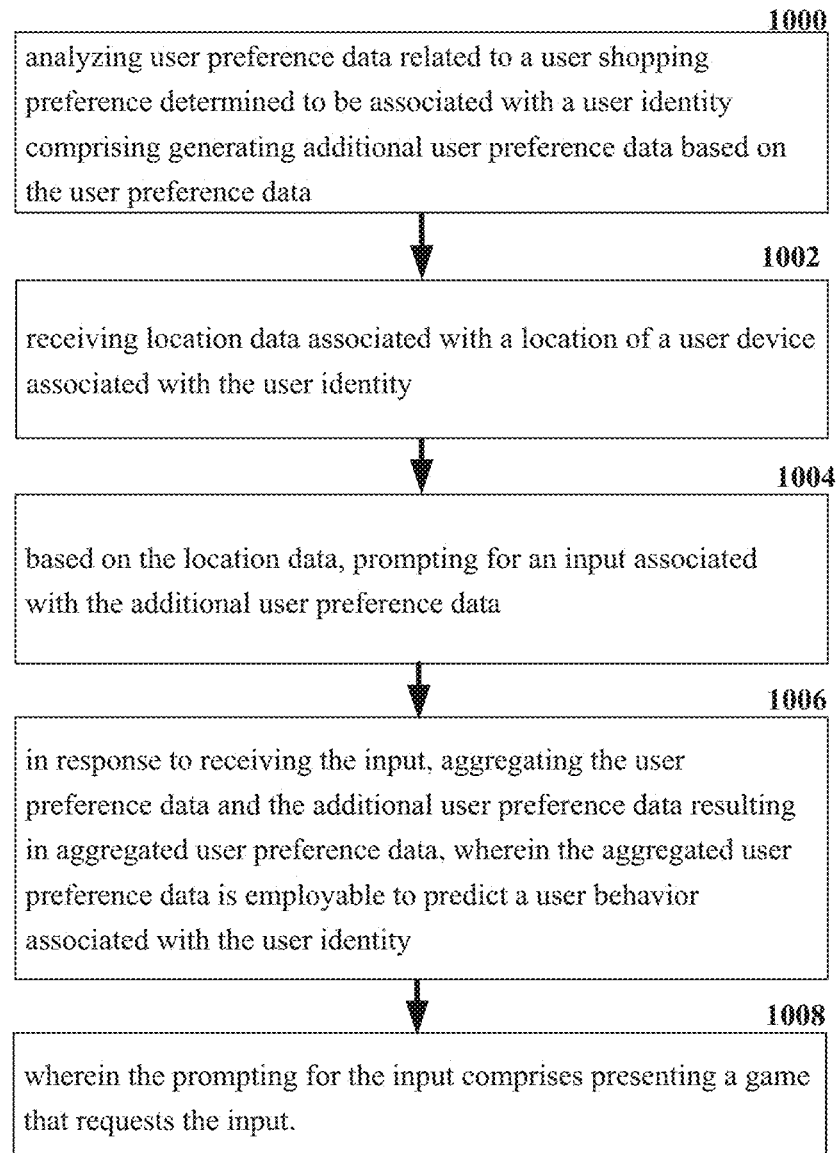
FIG. 10 illustrates an example schematic system block diagram of location based feedback services in accordance with prompting a user for input and predicting user behavior according to one or more embodiments.

Referring now to FIG. 10, illustrated is a an example schematic system block diagram of location based feedback services in accordance with prompting a user for input and predicting user behavior according to one or more embodiments. At element 1000, user preference data related to a user shopping preference determined to be associated with a user identity comprising generating additional user preference data based on the user preference data can be analyzed. The user preference data can be real-time communication (audible, gesture, mobile device, etc.) and/or obtained from social media/profile preferences. At element 1002 location data associated with a location of a user device associated with the user identity can be received. The location data of the device can be used to provide a general location of the user of the mobile device in relation to areas/items of interest. Based on the location data, an input associated with the additional user preference data can be prompted at element 1004. The input prompt can be in relation to a user shopping preference and in response to receiving the input, the user preference data and the additional user preference data can be aggregated resulting in aggregated user preference data, wherein the aggregated user preference data is employable to predict a user behavior associated with the user identity at element 1006. The prompting for the input can comprise presenting a game that requests the input at element 1008. Gamification of the input and input request can be used to facilitate the process in a seamless manner.

Figure 11:
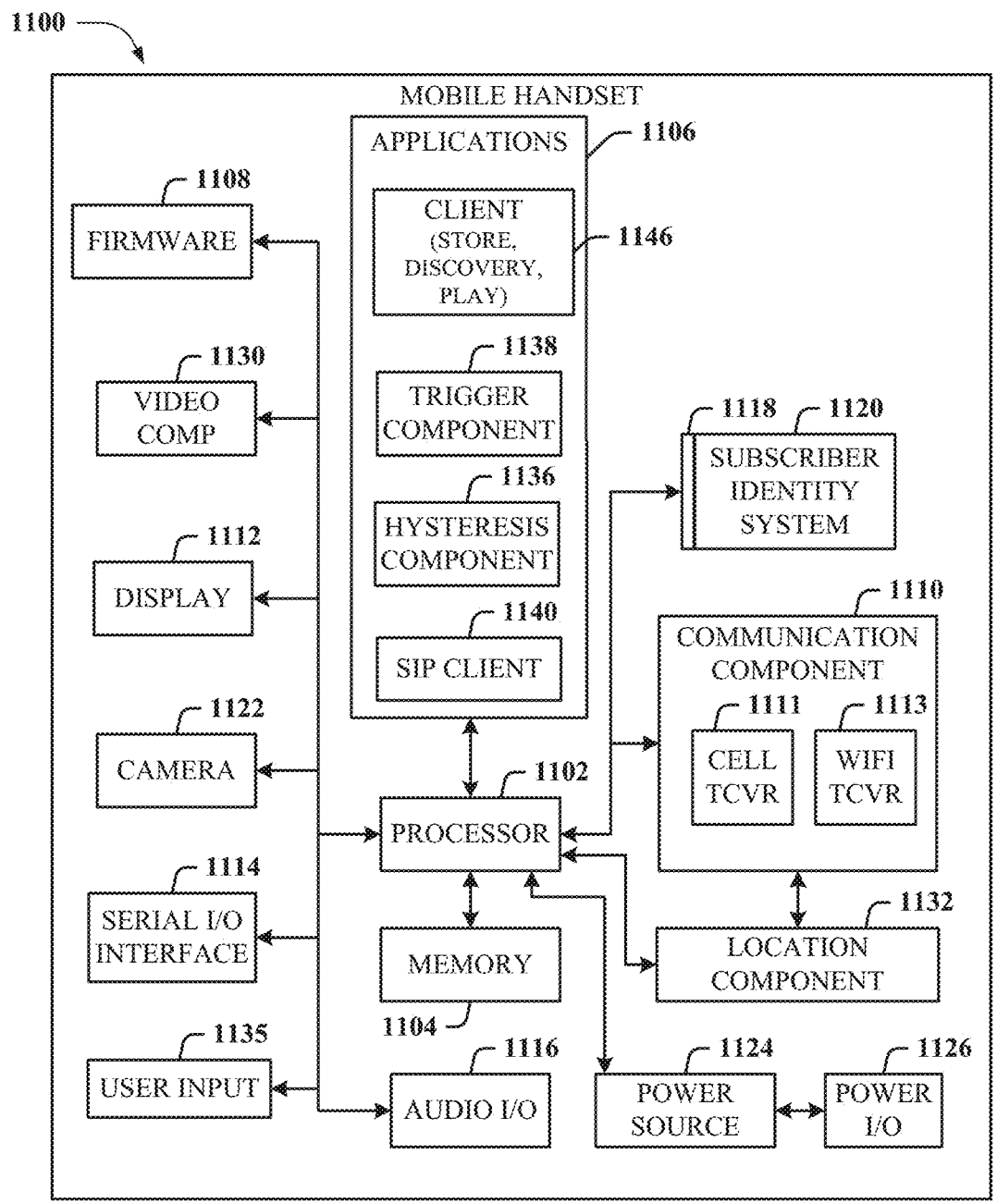
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and wearable/ingestible messaging-centric devices. The communications component 1110 also facilitates communications reception from terrestrial radio networks (e.g., broadcast), digital satellite radio networks, and Internet-based radio services networks.

The handset 1100 can comprise a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
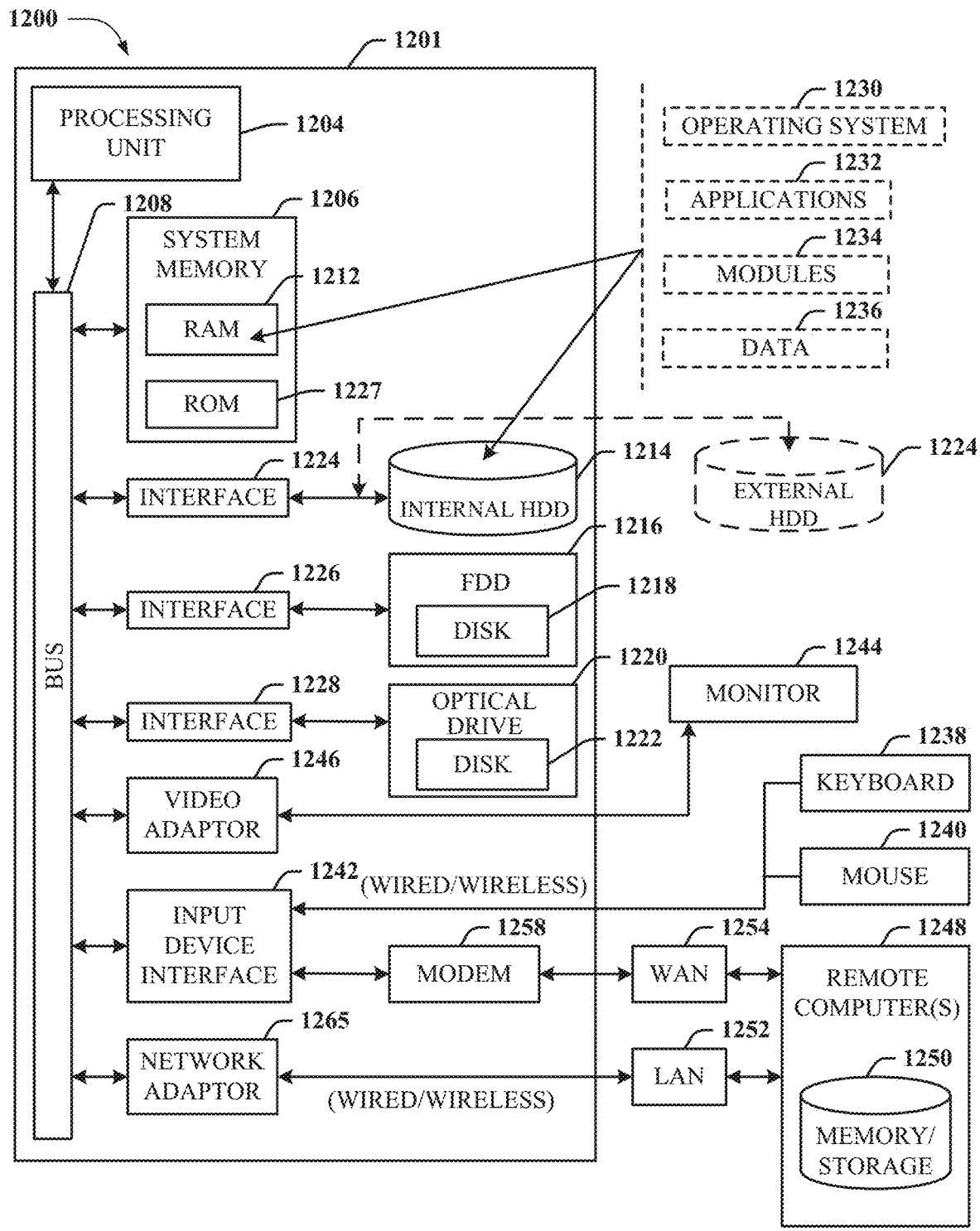
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by first network equipment comprising a processor, a first indication that a mobile device associated with a customer identity is within a range of the first network equipment;
    monitoring, by the first network equipment, a location of the mobile device while within the range of the first network equipment; and
    in response to monitoring the location of the mobile device and a second indication that an object is within the range of the first network equipment, generating, by the first network equipment, an avatar to prompt the mobile device for feedback associated with the object and with the customer identity, wherein the prompt comprises:
    initiating haptic feedback, from a floor, to be experienced by a customer associated with the customer identity to receive feedback data, wherein the haptic feedback directs the customer to a determined path to be traversed, associated with the object, from second network equipment.

2. The method of claim 1, wherein the prompt for the feedback further comprises verbally asking a question to the customer associated with the customer identity.

3. The method of claim 2, wherein the prompt for the feedback further comprises a request for a gesture from the customer.

4. The method of claim 3, wherein the gesture is a thumb gesture that is assigned a numerical value in accordance with how many times the thumb gesture is determined to have been performed.

5. The method of claim 4, further comprising:
    determining, by the first network equipment, that the thumb gesture is associated with a predetermined action.

6. The method of claim 1, further comprising:
    sending, by the first network equipment to the mobile device, action data, wherein the action data comprises navigational data related to a route to be potentially taken by the customer using the mobile device.

7. The method of claim 1, further comprising:
    in response to the avatar verbally asking a question, receiving, by the first network equipment, an answer to the question.

8. The method of claim 7, wherein the answer is received as a thumb gesture associated with the feedback related to the object and associated with the customer identity.

9. A system, comprising:
    a processor; and
    a memory that stores executable instructions that, when executed by the processor, facilitate performance of operations, comprising:
    determining that a mobile device is within a range of first network equipment;
    monitoring a location of the mobile device while within the range of the first network equipment; and
    based on the location of the mobile device and an indication that an item of interest is within the range of the first network equipment, generating an avatar to prompt for feedback, associated with the item of interest, attributable to a user identity associated with the mobile device, wherein the prompt comprises directing a user of the mobile device associated with the user identity to traverse a determined path via haptic feedback from a floor.

10. The system of claim 9, wherein the location is a first location, and wherein the operations further comprise:
    presenting a second location associated with the item of interest, wherein the presenting comprises presenting route data associated with the second location.

11. The system of claim 10, wherein the item of interest is a first item of interest, and wherein the operations further comprise:
    presenting a second item of interest and a third location of potential interest to the mobile device associated with the user identity via the avatar.

12. The system of claim 9, wherein the avatar prompts for feedback data by verbally asking a question to which an expected answer relates to the item of interest.

13. The system of claim 9, wherein the operations further comprise:
receiving feedback data representative of an expected answer to a question as a thumbs up gesture determined to be associated with the user identity.

14. The system of claim 9, wherein the prompt further comprises verbally asking a question, wherein the question is directed to the user attributable to the user identity, is related to the feedback associated with the item of interest, and is from second network equipment different from the first network equipment.

15. The system of claim 14, wherein the operations further comprise:
in response to the verbally asking the question, receiving feedback data as a thumbs up gesture from the user attributable to the user identity that was input in response to the prompt.

16. A non-transitory machine-readable medium, comprising executable instructions that, when executed by a processor, facilitate performance of operations, comprising:
in response to determining that a mobile device is within a range of a base station that is part of a network to which the mobile device is authorized to connect, determining a location of the mobile device; and
based on the location of the mobile device and an indication that an item is within the range of the base station, instructing that an avatar issue a verbal prompt for feedback related to the item and attributable to a user identity associated with the mobile device, wherein the verbal prompt comprises prompting a user associated with the user identity to traverse a determined path in accordance with haptic feedback from a floor.

17. The non-transitory machine-readable medium of claim 16, wherein the verbal prompt comprises a presentation of a game that requests the feedback.

18. The non-transitory machine-readable medium of claim 16, wherein the verbal prompt comprises a presentation experienced by a user associated with the user identity.

19. The non-transitory machine-readable medium of claim 16, wherein the verbal prompt is based on a time of day.

20. The non-transitory machine-readable medium of claim 16, wherein the operations further comprise generating preference data for the user identity in relation to a time of day.

* * * * *